(12) United States Patent
Shi et al.

(10) Patent No.: US 10,099,402 B2
(45) Date of Patent: Oct. 16, 2018

(54) VEHICLE CAPABLE OF STIRRING CONCRETE DURING TRANSPORTATION

(71) Applicant: Hefei University of Technology, Hefei (CN)

(72) Inventors: Qin Shi, Hefei (CN); Mansheng Dong, Hefei (CN); Chao Zhang, Hefei (CN); Yikai Chen, Hefei (CN)

(73) Assignee: Hefei University of Technology, Hefei, Anhui (CN)

( * ) Notice: Subject to any disclaimer, the term of this patent is extended or adjusted under 35 U.S.C. 154(b) by 0 days.

(21) Appl. No.: 15/520,787

(22) PCT Filed: Aug. 17, 2016

(86) PCT No.: PCT/CN2016/095640
§ 371 (c)(1),
(2) Date: Apr. 20, 2017

(87) PCT Pub. No.: WO2017/028783
PCT Pub. Date: Feb. 23, 2017

(65) Prior Publication Data
US 2017/0312937 A1    Nov. 2, 2017

(30) Foreign Application Priority Data

Aug. 18, 2015  (CN) .......................... 2015 1 0509627

(51) Int. Cl.
*B28C 5/20*     (2006.01)
*B28C 5/42*     (2006.01)
(Continued)

(52) U.S. Cl.
CPC ........ *B28C 5/4282* (2013.01); *B01F 7/00216* (2013.01); *B01F 7/12* (2013.01);
(Continued)

(58) Field of Classification Search
CPC ... B28C 5/4282; B28C 5/4268; B28C 5/4265; B28C 5/0831; B28C 5/0843;
(Continued)

(56) References Cited

U.S. PATENT DOCUMENTS 1,657,762 A * 1/1928 Paris ..................... B28C 5/4275
                                                                  180/53.1
1,928,380 A * 9/1933 Jaeger ................... B28C 5/4275
                                                                  220/314
(Continued)

FOREIGN PATENT DOCUMENTS

CH          369405 A  *  5/1963  .......... B28C 5/4272
CN       101474976 A      7/2009
(Continued)

OTHER PUBLICATIONS

English Translation of International Search Report for PCT/CN2016/095640, dated Nov. 23, 2016, 3 pages.

*Primary Examiner* — Charles Cooley
(74) *Attorney, Agent, or Firm* — Klarquist Sparkman, LLP

(57) ABSTRACT

A concrete mixing carrier, comprising a vehicle chassis and a mixing drum provided thereon. A drum housing of the mixing drum is cubic, supported horizontally on the vehicle chassis, and able to form an unloading state where a front portion is higher and a rear portion is lower; the mixing drum forms a closed drum housing; a feed inlet and a discharge outlet are respectively provided on a rear end plate; a rotary inner drum formed by splicing movable blades is provided in the drum body, and adjacent movable blades have therebetween a movement margin for rotation; each strip-shaped movable blade is supported at both ends by paired rollers respectively; stirring blades overhang towards inside of the drum body, backs of back plates are provided with drive racks, and drive gears, mutually (Continued)

engaged with the drive racks, are provided at corresponding positions of the drum body using a supporting bracket.

20 Claims, 4 Drawing Sheets

(51) Int. Cl.
| | | |
|---|---|---|
| | *B28C 5/08* | (2006.01) |
| | *B28C 5/18* | (2006.01) |
| | *B60P 3/16* | (2006.01) |
| | *B01F 7/00* | (2006.01) |
| | *B01F 7/12* | (2006.01) |
| | *B01F 13/00* | (2006.01) |
| | *B28C 5/12* | (2006.01) |
| | *B28C 5/34* | (2006.01) |

(52) U.S. Cl.
CPC ........ *B01F 13/0015* (2013.01); *B28C 5/0843* (2013.01); *B28C 5/12* (2013.01); *B28C 5/1862* (2013.01); *B28C 5/34* (2013.01); *B28C 5/4265* (2013.01); *B28C 5/4268* (2013.01); *B28C 5/4272* (2013.01); *B60P 3/16* (2013.01)

(58) Field of Classification Search
CPC ... B28C 5/0856; B28C 5/1825; B28C 5/1856; B28C 5/1862; B28C 5/4272; B28C 5/42; B60P 3/16; B01F 13/0015; B01F 7/12; B01F 7/00216
USPC ...................................................... 366/53–63
See application file for complete search history.

(56) References Cited

U.S. PATENT DOCUMENTS

| | | | | | |
|---|---|---|---|---|---|
| 2,038,158 | A | * | 4/1936 | Barrymore | ............ B28C 5/4275 366/44 |
| 2,048,657 | A | * | 7/1936 | Jaeger | ................... B28C 5/4275 366/40 |
| 4,506,983 | A | * | 3/1985 | Marr | ......................... B01F 9/06 366/192 |
| 5,683,177 | A | * | 11/1997 | Hoferichter | ....... B01F 15/00785 366/227 |
| 2017/0312937 | A1 | * | 11/2017 | Shi | ........................ B28C 5/4282 |

FOREIGN PATENT DOCUMENTS

| | | | |
|---|---|---|---|
| CN | 101856989 A | | 10/2010 |
| CN | 202037721 U | | 11/2011 |
| CN | 103223894 A | | 7/2013 |
| CN | 204036658 U | | 12/2014 |
| CN | 105150382 A | | 12/2015 |
| GB | 1194122 A | * | 6/1970 .......... B01F 13/0015 |
| JP | H11235946 | | 8/1999 |

* cited by examiner

VEHICLE CAPABLE OF STIRRING CONCRETE DURING TRANSPORTATION

CROSS REFERENCE TO RELATED APPLICATIONS

This is the U.S. National Stage of International Application No. PCT/CN2016/095640, filed Aug. 17, 2016, which was published in English under PCT Article 21(2), which in turn claims the benefit of Chinese Application No. 201510509627.4, filed Aug. 18, 2015.

TECHNICAL FIELD

The present invention relates to cement concrete mixing devices, and in particular to a concrete mixing carrier.

BACKGROUND ART

Cement concrete, which is one of the currently most important civil engineering materials, usually is supplied by a special concrete mixing station, and then transported by a concrete mixing carrier to a construction site. The concrete truck has its mixing drum kept in rotation all the time during transportation, to ensure that the concrete being carried will not be solidified or segregated.

The mixing drum is a vehicle-mounted concrete loading container which is generally made from a high-quality wear-resistant thin steel plate and is welded on its inner side wall with spiral blades such that the concrete can be automatically loaded and unloaded. When the mixing drum is rotating, the concrete moves along a spiral direction of the blades, and is mixed and stirred during continuous lifting and turning processes. During feeding and transportation processes, the mixing drum is rotated clockwise so that the concrete moves inwardly along the blades; and during discharging, the mixing drum is rotated anticlockwise so that the concrete is unloaded outwardly along the blades.

In the prior art, the mixing drum of the concrete mixing carrier is generally of a cylindrically fusiform structure, and is obliquely provided on a vehicle subframe, and the tail of the mixing drum is raised high. This form results in that the concrete mixing carrier has greatly reduced loading capacity, and is prone to lateral rollover, when turning or emergently braking, due to its high center of gravity. Thereby, there have been many reports of lateral rollover accidents in concrete tankers.

DISCLOSURE OF THE INVENTION

In order to avoid the above-mentioned shortcomings existing in the prior art, the present invention provides a concrete mixing carrier, to not only increase the loading capacity, but also effectively lower the center of gravity to avoid vehicle lateral rollover accidents.

The concrete mixing carrier provided by the present invention comprises a vehicle chassis and a mixing drum provided on the vehicle chassis, wherein a drum housing of the mixing drum is cubic and horizontally supported on the vehicle chassis and has a hinged rear support as a fulcrum of rotation; and a lifting mechanism is provided to lift a front end of the mixing drum when unloading, to form an unloading state in which the mixing drum has a front portion higher and a rear portion lower;

the mixing drum is configured to be a detachable drum body formed of a bottom plate, a left side plate, a right side plate and a top plate, and a front end plate is provided at a front end surface of the drum body and a rear end plate is provided at a rear end surface of the drum body, forming a closed drum housing; and a feed inlet and a discharge outlet are provided on the rear end plate, respectively;

a rotary inner drum formed by splicing individual movable blades is provided in the drum body, the movable blades, which are strip-shaped, are provided along a length direction of the drum body, and the adjacent movable blades are configured to have there between a movement margin for rotation; each of the strip-shaped movable blades is supported at both ends by paired rollers respectively, and the paired rollers are mounted on an inner side wall the drum body at corresponding positions by using a supporting bracket;

the movable blade is a stirring blade, which is provided on a front surface of a rectangular back plate along a length direction of the back plate, is located at the middle of the back plate and overhangs towards inside of the drum body, a drive rack is provided on a back surface of the back plate along a width direction of the back plate, and a drive gear mutually engaged with the drive rack is provided at a corresponding position of the drum body by using a supporting bracket; and a drum wall of the rotary inner drum is formed of the back plate.

That is, the concrete mixing carrier provided by the present invention comprises a vehicle chassis and a mixing drum provided on the vehicle chassis, wherein the mixing drum is approximately cubic and horizontally supported on the vehicle chassis, and has a hinged rear support as a fulcrum of rotation;

the vehicle chassis is provided thereon with a lifting mechanism configured for lifting a front end of the mixing drum when unloading to form an unloading state in which the mixing drum has a front portion higher and a rear portion lower;

the mixing drum comprises a detachable drum body formed of a bottom plate, a left side plate, a right side plate and a top plate, and the drum body is provided with a front end plate at a front end surface and a rear end plate at a rear end surface, to make the drum body form a closed drum housing; and a feed inlet and a discharge outlet are provided on the rear end plate;

a plurality of strip-shaped movable blades are provided inside the drum body along a length direction thereof, the movable blades are spliced to form a rotary inner drum, and the adjacent movable blades are configured to have there between a movement margin for rotation; both ends of the movable blade are supported by paired rollers, respectively, and the paired rollers are mounted on an inner side wall of the drum body at corresponding positions by using a supporting bracket;

the movable blade includes a back plate, and a stirring blade which is provided on a front surface of the back plate and at the middle of the back plate along a length direction of the back plate and overhangs towards inside of the drum body, a drive rack is provided on a back surface of the back plate along a width direction of the back plate, and a drive gear mutually engaged with the drive rack is provided at a corresponding position of the drum body by using a supporting bracket; and a drum wall of the rotary inner drum is formed of the back plate.

Further, the movable blade is provided with inclined end plates inclined towards inside of the drum body at both ends of the stirring blade on the front surface of the back plate of the movable blade respectively, and the inclined end plates are configured such that the rotary inner drum is gradually narrowed at a front end and a rear end.

That is, further, a front end inclined end plate and a rear end inclined end plate inclined towards inside of the drum body are respectively provided at both ends of the stirring blade on the front surface of the back plate, and the front end inclined end plate and the rear end inclined end plate are configured that the rotary inner drum is gradually narrowed at the front end and the rear end.

Further, the adjacent two movable blades are in hinged connection with each other through the back plate, and water stop belts are provided between the adjacent back plates and between the adjacent inclined end plates, respectively.

That is, further, the adjacent two movable blades are in hinged connection with each other through the back plate.

Preferably, water stop belts are provided between the adjacent back plates, between the adjacent front end inclined end plates and between the adjacent rear end inclined end plates, respectively.

Preferably, a support roller configured for supporting the inner drum is provided at the bottom of the rotary inner drum, and a supporting bracket of the support roller is welded on the inner side wall of the drum body.

That is, preferably, a support roller for supporting the rotary inner drum is provided at the bottom of the rotary inner drum, and a supporting bracket of the support roller is welded on the inner side wall of the drum body.

Further, narrowed openings, formed by the front end inclined end plate and the rear end inclined end plate, and the front end plate and the rear end plate, form respectively a rotary seal structure.

Optionally, the inclining gradient of the front end inclined end plate on the back plate is greater than the inclining gradient of the rear end inclined end plate on the back plate.

Preferably, the stirring blade is inclined towards a direction of rotation of the rotary inner drum.

Further, the drive gear is driven by a motor through a drive shaft.

Preferably, protective frames welded on the vehicle chassis are provided on both left and right sides of the mixing drum, respectively.

The concrete mixing carrier provided according to the present invention is capable of bringing about at least one of the following beneficial effects:

1. the mixing drum of the concrete mixing carrier provided by the present invention is provided horizontally, effectively lowering the center of gravity and thereby improving the safety of operation of the vehicle and preventing lateral rollover;

2. the mixing drum of the concrete mixing carrier provided by the present invention has an approximately cubic shape, enabling to obtain a large loading capacity; and 3. the mixing drum of the concrete mixing carrier provided by the present invention has a detachable drum body, and its outer wall is in a detachable structure, facilitating detection and maintenance.

BRIEF DESCRIPTION OF THE DRAWINGS

In order to illustrate the technical solutions of specific embodiments of the present invention or in the prior art more clearly, drawings required to be used for description of the specific embodiments or the prior art will be introduced briefly below, it would be apparent that the drawings in the following description illustrate some embodiments of the present invention, and it would be understood by those skilled in the art that other drawings could be derived from these drawings without using any inventive efforts.

Figure 1:
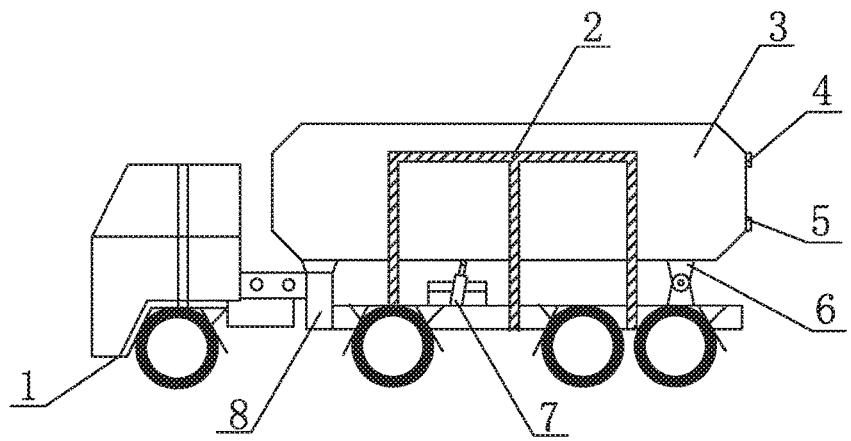
FIG. 1 is a schematic structural view of a concrete mixing carrier provided according to an embodiment of the present invention.
Figure 2:
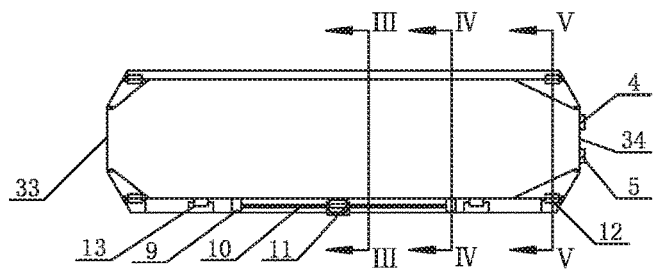
FIG. 2 is a schematic sectional view, in elevation, of a mixing drum.

Reference numerals: vehicle chassis 1, protective frame 2, mixing drum 3, feed inlet 4, discharge outlet 5, rear support 6, lifting mechanism 7, front support 8, drive gear 9, drive shaft 10, motor 11, paired rollers 12, support roller 13, drum body 31, rotary inner drum 32, front end plate 33, rear end plate 34, movable blade 35, back plate 36, stirring blade 37, front end inclined end plate 38, rear end inclined end plate 38', drive rack 39, bottom plate 40, left side plate 41, right side plate 42, top plate 43.

DETAILED DESCRIPTION OF EMBODIMENTS

In order to make the objects, technical solutions and advantages of the embodiments of the present invention more clear, the technical solutions of the embodiments of the present invention will be described below clearly and completely with reference to the drawings of the embodiments of the present invention. It would be apparent that the embodiments described are some, but not all of the embodiments of the present invention. All the other embodiments obtained by those skilled in the art in light of the embodiments of the present invention without using inventive efforts would fall within the scope of the present invention as claimed.

Thus, the following detailed description of the embodiments of the present invention, as represented in the figures, is not intended to limit the scope of the present invention as claimed, but is merely representative of selected embodiments of the present invention. All the other embodiments obtained by those skilled in the art in light of the embodiments of the present invention without using inventive efforts would fall within the scope of the present invention as claimed.

In the description of the present invention, it should be indicated that orientation or position relations indicated by the terms such as "front surface", "back surface" or "back", "center", "up", "down", "left", "right", "vertical", "horizontal", "inner", and "outer" etc, are the orientation or position relations shown based on the drawings, or the orientation or positional relations in which the inventive product is conventionally placed in use, merely for facilitating the description of the present invention and simplifying the description, but not intended to indicate or imply that the referred devices or elements must be in a particular orientation, or constructed or operated in the particular orientation, and therefore they should not be construed as limiting the present invention.

Referring to FIG. 1, a concrete mixing carrier provided according to the present embodiment comprises a vehicle chassis 1 and a mixing drum 3 provided on the vehicle chassis 1, a drum housing of the mixing drum 3 is cubic (or the mixing drum 3 is approximately cubic), and the mixing drum 3 is horizontally supported on the vehicle chassis 1 and is supported by a front support 8, a rear support 6 and a lifting mechanism 7 together, and has the hinged rear support 6 as a fulcrum of rotation; and the lifting mechanism 7 is provided to be used for lifting a front end of the mixing drum 3 during unloading (i.e., the vehicle chassis 1 above is provided thereon with a lifting mechanism 7 for lifting a front end of the mixing drum 3 during unloading) to form an unloading state in which the mixing drum has a front portion higher and a rear portion lower.

Figure 3:
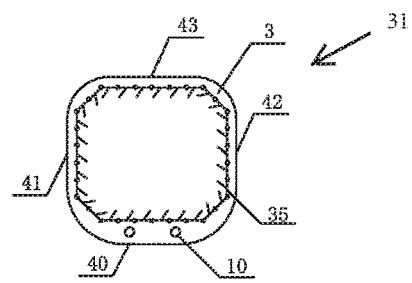
FIG. 3 is a schematic structural view showing a section of the mixing drum taken at the line III-III in FIG. 2.
Figure 4:
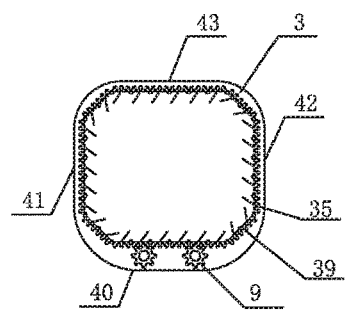
FIG. 4 is a schematic structural view showing a section of the mixing drum taken at the line IV-IV in FIG. 2.
Figure 5:
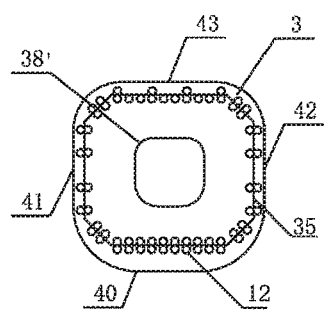
FIG. 5 is a schematic structural view showing a section of the mixing drum taken at the line V-V in FIG. 2.

The lifting mechanism 7 includes a lifting oil cylinder, an oil cylinder upper support and an oil cylinder lower support, upper and lower ends of the lifting oil cylinder are hinged with the oil cylinder upper support and the oil cylinder lower support respectively, and the oil cylinder upper support and the oil cylinder lower support are welded onto a bottom plate 40 (FIG. 3) of the mixing drum 3 and the vehicle chassis 1, respectively.

Referring to FIGS. 2 to 5, the mixing drum 3 is configured to be a detachable drum body 31 is formed of a bottom plate 40, a left side plate 41, a right side plate 42 and a top plate 43 (i.e., the mixing drum 3 has a detachable drum body 31 formed of a bottom plate 40, a left side plate 41, a right side plate 42 and a top plate 43), and a front end plate 33 is provided at a front end surface of the drum body 31, and a rear end plate 34 is provided at a rear end surface of the drum body 31, forming a closed drum housing (i.e., the drum body 31 is provided with a front end plate 33 at a front end surface and is provided with a rear end plate 34 at a rear end surface, to make the drum body 31 form a closed drum housing); and a feed inlet 4 and a discharge outlet 5 are provided on the rear end plate 34 respectively, and the discharge outlet 5 is located above below the feed inlet 4.

A rotary inner drum 32 formed by splicing individual movable blades 35 is provided in the drum body 31. The movable blades 35, which are strip-shaped, are provided along a length direction of the drum body 31, and adjacent movable blades therebetween a movement margin for rotation (i.e., a plurality of strip-shaped movable blades 35 are provided inside the drum body 31 along a length direction thereof, the movable blades 35 are spliced to form a rotary inner drum 32, and the adjacent movable blades 35 have therebetween a movement margin for rotation). Each of the strip-shaped movable blades 35 is supported at both ends by paired rollers 12 respectively (i.e., both ends of the movable blades 35 above are supported by paired rollers 12, respectively), the paired rollers 12 are mounted on an inner side wall of the drum body 31 at corresponding positions by using a supporting bracket, and the rotary inner drum 32, the front end plate 33 and the rear end plate 34 form a closed loading space.

Referring to FIGS. 6 to 9, the movable blade 35 is a stirring blade 37, which is provided on a front surface of a rectangular back plate 36 along a length direction of the back plate 36, is located at the middle of the back plate and overhangs towards inside of the drum body (i.e., the movable blade 35 above includes a back plate 36, and a stirring blade 37, which is provided on a front surface of the back plate 36, and at the middle of the back plate 36, along a length direction of the back plate 36 and overhangs towards inside of the drum body 31), and in order to improve stirring effect, the stirring blade 37 may have inclination towards a direction of rotation of the rotary inner drum 32 (i.e., the stirring blade 37 is inclined towards a direction of rotation of the rotary inner drum 32), so that the stirring blade 37 creates an effect of "shoveling" on the concrete in the rotary inner drum 32; a drive rack 39 is provided on a back surface of the back plate 36 along a width direction of the back plate, and a drive gear 9 mutually engaged with the drive rack 39 is provided at a corresponding position of the drum body 31 by using a supporting bracket; and a drum wall of the rotary inner drum 32 is formed of the back plate 36.

The drive gear 9 is provided between the bottom plate 40 of the mixing drum 3 and the rotary inner drum 32, the drive gear 9 is driven by a motor 11, and the motor 11 drives one or more drive gears 9 through a drive shaft 10 connected with the motor 11.

Figure 6:
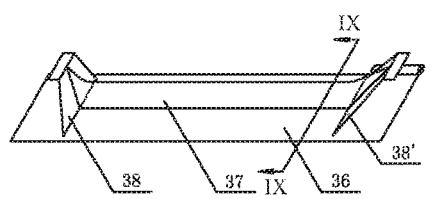
FIG. 6 is a schematic structural view of a movable blade.
Figure 7:
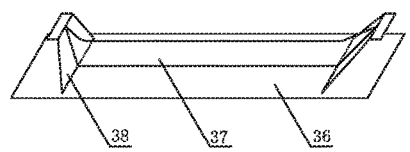
FIG. 7 is a schematic structural view of a movable blade without a stirring blade.
Figure 8:
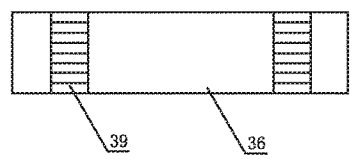
FIG. 8 is a schematic structural view of the bottom of the movable blade.
Figure 9:
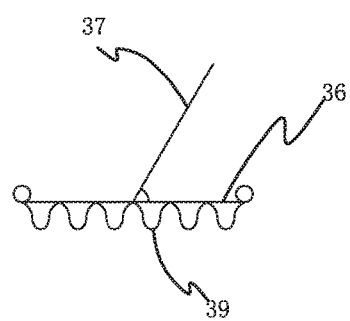
FIG. 9 is a schematic structural view showing a section of the mixing drum taken at the line IX-IX in FIG. 6.

In the present embodiment, the corresponding structural arrangement also includes:

inclined end plates inclined towards inside of the drum body are provided on the front surface of the back plate 36 of the movable blade 35, and located at both ends of the stirring blade 37 respectively, the inclined end plates are configured such that the rotary inner drum 32 is gradually narrowed at a front end and a rear end, and the narrowed openings, formed at the front end and the rear end, and the front end plate and the rear end plate form respectively a rotary seal structure (i.e., a front end inclined end plate 38 and a rear end inclined end plate 38' inclined towards inside of the drum body 31 are provided at both ends of the stirring blade 37 on the front surface of the back plate 36 above respectively, the front end inclined end plate 38 and the rear end inclined end plate 38' are configured such that the rotary inner drum 32 is gradually narrowed at a front end and a rear end, and the narrowed openings, formed by the front end inclined end plate 38 and the rear end inclined end plate 38', and the front end plate 33 and the rear end plate 34 form respectively a rotary seal structure); referring to FIGS. 6 and 7, the inclined end plates are the front end inclined end plate 38 and the rear end inclined end plate 38' respectively, and in order to facilitate material discharging, the inclining gradient on the back plate 36 of the rear end inclined end plate 38', which is located at a tail of the movable blade 35, is smaller, to avoid residues generated during discharging, and the inclining gradient of the front end inclined end plate 38 on the back plate 36 is greater, substantially forming a front end surface (i.e., the inclining gradient of the above mentioned front end inclined end plate 38 on the back plate 36 is greater than the inclining gradient of the rear end inclined end plate 38' on the back plate 36).

Figure 10:
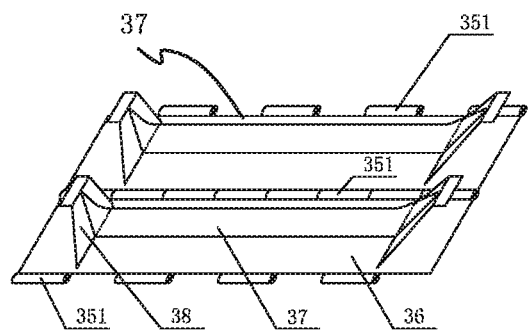
FIG. 10 is a schematic structural view of a movable blade similar to FIG. 7, except showing a second movable blade adjacent and hinged to the first movable blade.
Figure 11:
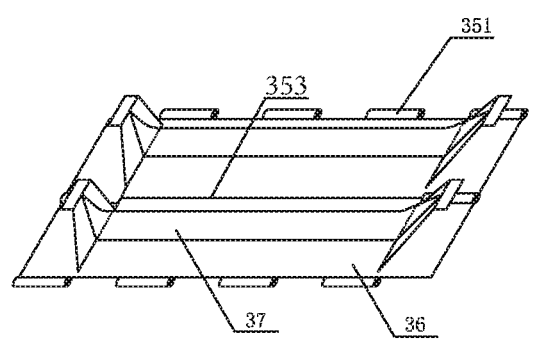
FIG. 11 is a schematic structural view of first and second movable blades similar to FIG. 10, except showing a water stop belt positioned between the blades.

As shown in FIG. 10, the adjacent two movable blades 35 can have a hinged connection 351 with each other through the back plate 36. As shown in FIG. 11, a water stop belt 353 is provided between the adjacent back plates 36 and between the adjacent inclined end plates respectively (i.e., water stop belts are provided between the adjacent back plates 36, between the adjacent front end inclined end plate 38 and between the adjacent rear end inclined end plate 38', respectively).

A support roller 13 for supporting the rotary inner drum 32 is provided at the bottom of the rotary inner drum 32, and a supporting bracket of the support roller 13 is welded on the inner side wall of the drum body 31. Protective frames 2 are provided on both left and right sides of the mixing drum 3 respectively, and the protective frames 2 are formed by welding steel frames and welded onto the vehicle chassis 1

(i.e., the protective frames 2 welded on the vehicle chassis 1 are provided on both left and right sides of the mixing drum 3, respectively).

The above description are merely illustrative of preferred embodiments of the present invention and are not intended to limit the present invention, and it would be understood by those skilled in the art that various modifications and variations can be made to the present invention. Any modifications, equivalent alternations, and improvements made without departing from the spirit and principle of the present invention should fall within the scope of protection of the present invention.

We claim:

1. A concrete mixing carrier, comprising a vehicle chassis and a mixing drum provided on the vehicle chassis, wherein the mixing drum is approximately cubic and horizontally supported on the vehicle chassis, and has a hinged rear support as a fulcrum of rotation; and the vehicle chassis is provided thereon with a lifting mechanism configured for lifting a front end of the mixing drum when unloading, to form an unloading state in which the mixing drum has a front portion higher and a rear portion lower;

the mixing drum comprises a detachable drum body formed of a bottom plate, a left side plate, a right side plate and a top plate, and the drum body is provided with a front end plate at a front end surface and a rear end plate at a rear end surface, to make the drum body form a closed drum housing; and a feed inlet and a discharge outlet are provided on the rear end plate;

a plurality of strip-shaped movable blades are provided inside the drum body along a length direction of the drum body, the movable blades are spliced to form a rotary inner drum disposed in the drum body, and adjacent movable blades are configured to have therebetween a movement margin for rotation; both ends of the movable blades are supported by paired rollers respectively, and the paired rollers are mounted on an inner side wall of the drum body at corresponding positions by using a supporting bracket;

each movable blade comprises a back plate, and a stirring blade which is provided on a front surface of the back plate and at middle of the back plate along a length direction of the back plate and overhangs towards an inside of the drum body, a drive rack is provided on a back surface of the back plate in a width direction of the back plate, and a drive gear mutually engaged with the drive rack is provided at a corresponding position of the drum body by using a supporting bracket; and a drum wall of the rotary inner drum is formed of the back plate.

2. The concrete mixing carrier according to claim 1, further comprising a front end inclined end plate and a rear end inclined end plate, wherein the front end inclined end plate and the rear end inclined end plate are inclined towards an inside of the drum body, are respectively provided at both ends of the stirring blade on the front surface of the back plate, and are configured such that the rotary inner drum is gradually narrowed at a front end and a rear end.

3. The concrete mixing carrier according to claim 2, wherein two adjacent movable blades are in hinged connection with each other through the back plate.

4. The concrete mixing carrier according to claim 3, wherein a water stop belt is provided between two adjacent back plates and between two adjacent inclined end plates.

5. The concrete mixing carrier according to claim 4, wherein the stirring blade is inclined towards a direction of rotation of the rotary inner drum.

6. The concrete mixing carrier according to claim 5, wherein the drive gear is driven by a motor through a drive shaft.

7. The concrete mixing carrier according to claim 3, wherein the stirring blade is inclined towards a direction of rotation of the rotary inner drum.

8. The concrete mixing carrier according to claim 7, wherein the drive gear is driven by a motor through a drive shaft.

9. The concrete mixing carrier according to claim 2, wherein narrowed openings, formed by the front end inclined end plate and the rear end inclined end plate, and the front end plate and the rear end plate, respectively, form a rotary seal structure.

10. The concrete mixing carrier according to claim 9, wherein an inclining gradient of the front end inclined end plate on the back plate is greater than an inclining gradient of the rear end inclined end plate on the back plate.

11. The concrete mixing carrier according to claim 7, wherein the stirring blade is inclined towards a direction of rotation of the rotary inner drum.

12. The concrete mixing carrier according to claim 6, wherein the stirring blade is inclined towards a direction of rotation of the rotary inner drum.

13. The concrete mixing carrier according to claim 2, wherein the stirring blade is inclined towards a direction of rotation of the rotary inner drum.

14. The concrete mixing carrier according to claim 13, wherein the drive gear is driven by a motor through a drive shaft.

15. The concrete mixing carrier according to claim 1, wherein a support roller, configured for supporting the rotary inner drum, is provided at a bottom of the rotary inner drum, and a supporting bracket of the support roller is welded on the inner side wall of the drum body.

16. The concrete mixing carrier according to claim 5, wherein the stirring blade is inclined towards a direction of rotation of the rotary inner drum.

17. The concrete mixing carrier according to claim 16, wherein the drive gear is driven by a motor through a drive shaft.

18. The concrete mixing carrier according to claim 1, wherein the stirring blade is inclined towards a direction of rotation of the rotary inner drum.

19. The concrete mixing carrier according to claim 18, wherein the drive gear is driven by a motor through a drive shaft.

20. The concrete mixing carrier according to claim 1, wherein protective frames, welded onto the vehicle chassis, are provided on opposite sides of the mixing drum, respectively.

* * * * *